(12) United States Patent
Pedersen et al.

(10) Patent No.: US 10,073,661 B2
(45) Date of Patent: Sep. 11, 2018

(54) SECURITY EXTENSIONS FOR NON-VOLATILE MEMORY

(71) Applicant: Atmel Corporation, San Jose, CA (US)

(72) Inventors: Frode Milch Pedersen, Trondheim (NO); Ian Fullerton, Los Gatos, CA (US); Joseph Martinez, Fremont, CA (US); Martin Olsson, Trondheim (NO)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 15/385,810

(22) Filed: Dec. 20, 2016

(65) Prior Publication Data

US 2018/0024781 A1 Jan. 25, 2018

Related U.S. Application Data

(60) Provisional application No. 62/364,815, filed on Jul. 20, 2016.

(51) Int. Cl.
*G11C 8/00* (2006.01)
*G06F 3/06* (2006.01)

(52) U.S. Cl.
CPC ............ *G06F 3/0679* (2013.01); *G06F 3/062* (2013.01); *G06F 3/0655* (2013.01); *G06F 2212/72* (2013.01)

(58) Field of Classification Search
CPC ...... G06F 3/0679; G06F 3/062; G06F 3/0655; G06F 2212/72
See application file for complete search history.

(56) References Cited

U.S. PATENT DOCUMENTS

2009/0316889 A1* 12/2009 MacDonald ............ G06F 21/10
380/201
2012/0224689 A1* 9/2012 Rodgers ............. H04N 21/4627
380/255

* cited by examiner

*Primary Examiner* — Mohammed A Bashar
(74) *Attorney, Agent, or Firm* — Fish & Richardson P.C.

(57) ABSTRACT

The disclosed embodiments provide security extensions for memory (e.g., non-volatile memory) by means of address and data scrambling and differential data storage to minimize exposure to side channel attacks and obfuscate the stored data. The scrambling function maximizes reverse engineering costs when recovering sequences of secret keys.

20 Claims, 3 Drawing Sheets

SECURITY EXTENSIONS FOR NON-VOLATILE MEMORY

CROSS-REFERENCE TO RELATED APPLICATION

This application claims priority to U.S. Provisional Patent Application No. 62/364,815, filed Jul. 20, 2016, the entire contents of which are incorporated herein by reference.

TECHNICAL FIELD

The subject matter of this disclosure relates generally to non-volatile memory (NVM).

BACKGROUND

Secure embedded systems typically rely on encrypted communication with secret keys stored within a secure device. Such secure embedded systems may also contain other security critical information (e.g., certificates, serial numbers, customization identifiers (IDs), or monotonic NVM counters). This information can be stored in the NVM of a flash microcontroller. NVM, however, is not considered secure enough for general usage because it is prone to known attack types.

For example, side channel attacks are particularly easy to execute and can reveal the Hamming weight of the keys written to or read from NVM. This is an issue for NVM since the sense amplifiers used to read NVM have a strong current signature. Another known attack type is intrusive reverse engineering, which can allow readout of NVM bit cells and reveal their contents. While a more advanced method of attack, the reverse engineering can be subcontracted to companies with special equipment. NVM is far more prone to such attacks than random access memory (RAM) since the cells retain their data even in a highly intrusive attack.

If more than a bare minimum of security is needed, a secure element can be used to handle secret keys in an application, such as a separate chip designed for protecting security critical information against attacks. Such secure elements, however, add to the bill of material (BOM) cost, board space and complexity of the application.

SUMMARY

The disclosed embodiments provide security extensions for on-chip NVM by means of address and data scrambling and differential data storage to minimize exposure to side channel attacks and obfuscate the stored data. The scrambling function maximizes reverse engineering costs when recovering sequences of secrete keys.

In an embodiment, a memory system comprises: memory; a memory controller coupled to the memory and operable to: receive a memory address and write data; determine that the memory address accesses a secure data region in the non-volatile memory; responsive to the determining, differentially expand the write data; and write the expanded write data to the secure data region at the memory address.

In an embodiment, a memory controller comprises: non-volatile memory; a processor coupled to the non-volatile memory and operable to: receive a memory address and write data; determine that the memory address accesses a secure data region in the non-volatile memory; responsive to the determining, differentially expand the write data; and write the expanded write data to the secure data region at the memory address.

In an embodiment, a method comprises: receiving, by a memory controller, a memory address and write data; determining, by the memory controller, that the memory address accesses a secure data region in memory; responsive to the determining: differentially expanding the write data; and writing the expanded write data to the secure data region at the memory address.

In an embodiment, a non-transitory, computer-readable storage medium having instructions stored thereon, which, when executed one or more processors, causes the one or more processors to perform operations comprising: receiving, by a memory controller, a memory address and write data; determining, by the memory controller, that the memory address accesses a secure data region in memory embedded in or coupled to the memory controller; responsive to the determining: differentially expanding the write data; and writing the expanded write data to the secure data region at the memory address.

DETAILED DESCRIPTION

The disclosed embodiments improve data storage in on-chip NVM with secure extensions to the NVM controller by translating the data stored in the NVM to a version less prone to attack. When enabled, these secure extensions are virtually transparent in normal use, allowing random access to the protected data. The disclosed embodiments eliminate the need for an external secure element in many embedded applications.

Example Memory Controller

Figure 1:
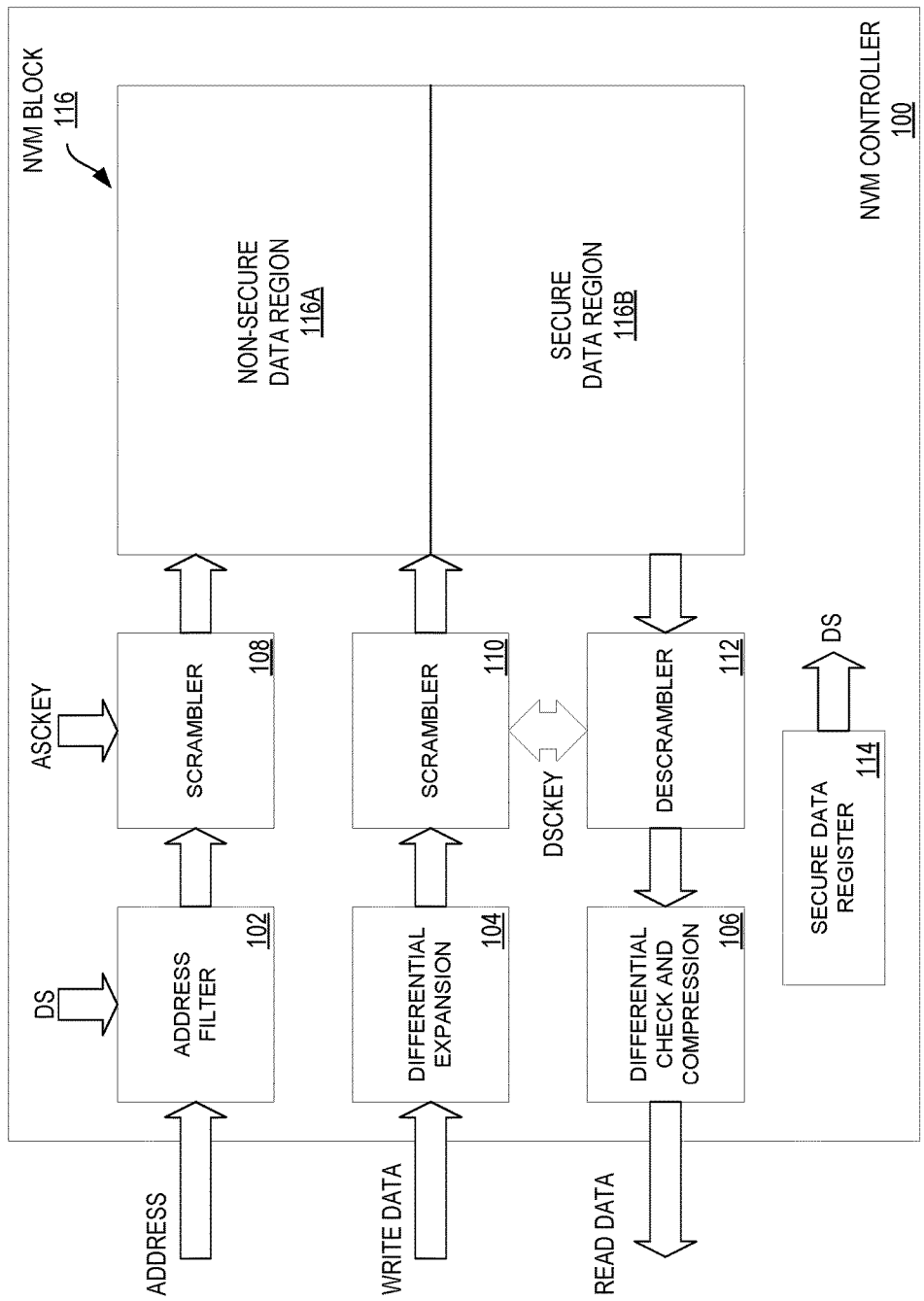
FIG. 1 illustrates an NVM system with secure extensions, according to an embodiment.

FIG. 1 illustrates an NVM controller 100 with secure extensions, according to an embodiment. Controller 100 includes address filter 102, differential expansion module 104, differential check and compression module 106, address scrambler module 108, data scrambler module 110, data descrambler 112, secure data register 114 and NVM block 116. NVM block 116 includes non-secure data region 116A and secure data region 116B.

Address filter 102 identifies the secure data region 116B within NVM block 116. Memory accesses are subjected to two translation methods which can optionally be enabled: differential data storage to minimize the side channel signature and scrambling of the data and address (e.g., using permutation-based scrambling).

When differential data storage is enabled, secure data region 116B of NVM block 116 will be read and written using differential access. Differential access means each data bit is converted to an m-bit counterpart. For example, if m=2, then each bit of data is expanded into two bits as follows: 0=10 and 1=01. Other combinations are also possible.

In general, differential access conversion in Equation [1]:

$$data\_nvm[i*m+1:i*m]=\{!data\_bus[i],data\_bus[i]\}. \quad [1]$$

When data is read back, the data is subject to a differential check to confirm the data integrity using Equation [2]:

$$data\_ok=(data\_nvm[i*m]\verb|^|data\_nvm[i*m+1]) \text{ for all } i=0 \ldots (n-1), \quad [2]$$

where n is the access width in bits

These conversions allow a tamper attack (e.g. fault injection in the data array or readout) to be immediately detected. If data integrity is confirmed, the inverse data is discarded, and the non-inverted data is returned on the bus using Equation [3]:

$$data\_bus[i]=data\_nvm[i*m]. \quad [3]$$

Using differential data storage every data value will have the same number of 1s and 0s, thus the Hamming weight is constant and the Hamming distance between any values is 0, significantly raising the threshold for side-channel attacks based on power analysis.

Access Width Conversion

The differential data representation requires twice as many bits to be accessed on the NVM block interface compared to the system data bus. Normally the read interface of NVM block 116 is at least twice as wide as the system data bus, allowing data to be read back in a single operation. The NVM block write interface to the page buffer, however, is rarely wider than the system bus. If the NVM block write interface is not at least twice the width of the bus access, NVM controller 100 emulates the differential write operation in two write operations to the NVM block interface. For example, if NVM block 116 allows writing 32 bits at a time, a 32-bit bus access needs to be translated into two write operations on NVM block 116.

Scrambling Protection Scheme

Secure data stored in NVM block 116 can be scrambled to obfuscate the logical representation of the data using a conventional n-bit scrambling function. The effectiveness of the scrambling is related to the number of bits used for the scrambling key. A example simple and low cost scrambling function is to apply a bitwise operation on the data and address with a user-defined data scrambling key (DSCKEY) and a user-defined address scrambling key (ASCKEY), respectively.

Secure Data Register

The amount of secure data in a system varies from a single key of few bytes to several KB of protected information. Because differential data storage doubles the memory consumption of the stored data, NVM controller 100 includes secure data (DS) configuration register 214 to define the size of secure data region 116B of NVM block 116 that is subject to security translation. NVM controller 100 detects write or read operations to secure data region 116B defined by Equation [4]:

$$DS\_BASE<=bus\_address<DS\_BASE+ DS*ROW\_SIZE, \quad [4]$$

where DS is the number of rows reserved for secure data, assuming that erase is possible on a row granularity, DS_BASE is the base memory address and ROW_SIZE is the size of a row.

Only operations falling within the range defined in Equation [4] will be translated according to the chosen data protection scheme. In an embodiment, differential data storage and scrambling can be enabled independent of each other, especially since differential data storage reduces the available storage space.

Reserved Data Space

Differential data storage changes the mapping of physical addresses to flash rows, since each row contains half as many bytes. Bus addresses falling within secure data region 116B are translated so that only half of secure data region 116B is addressable. Accesses to the upper half of the secure data space results in a bus error with 0xFFFFFFFF returned on the read data bus, for example.

Figure 2:
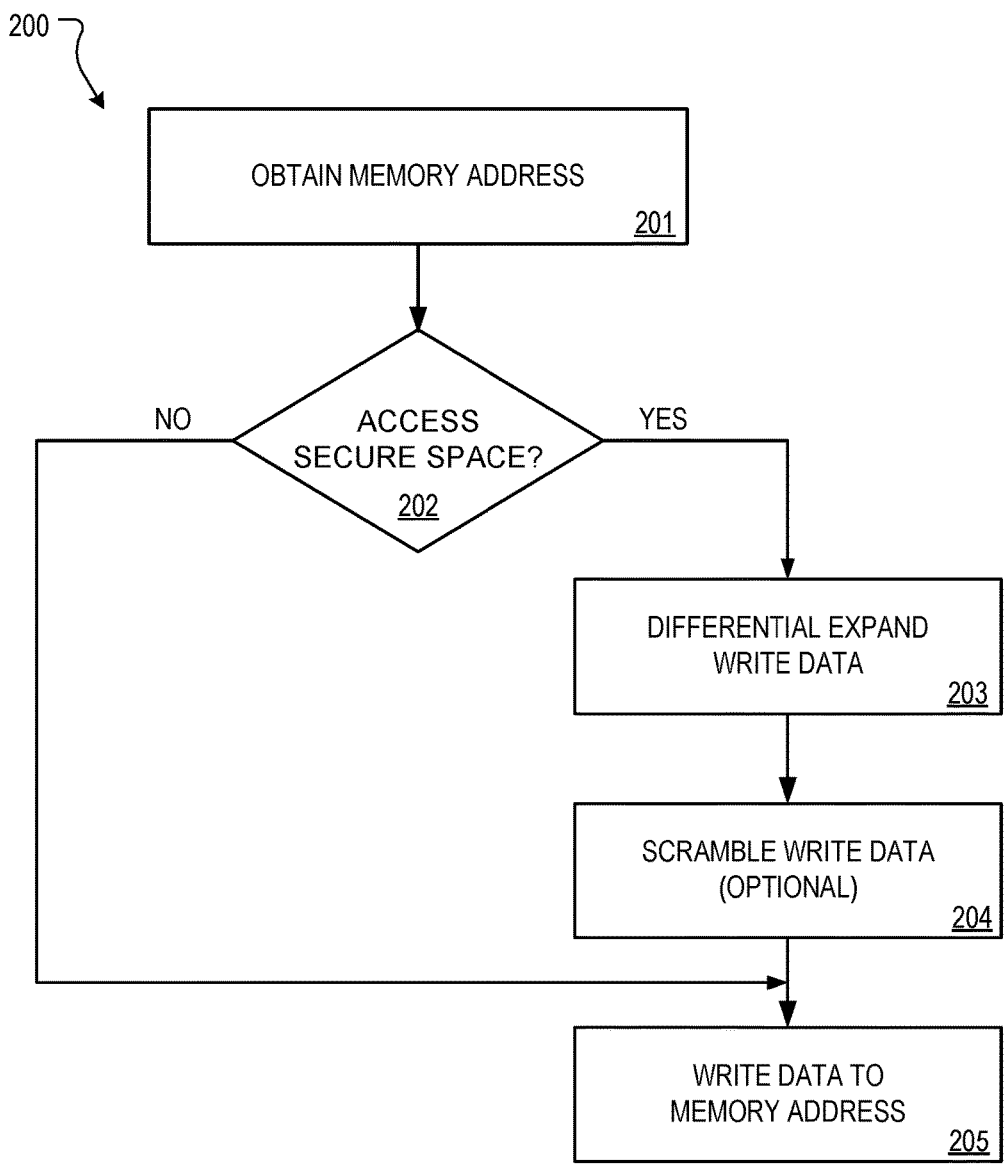
FIG. 2 is a flow diagram of process that uses security extensions to write secure data to NVM, according to an embodiment.

FIG. 2 is a flow diagram of process 200 that uses security extensions to write to NVM, according to an embodiment. Process 200 can be implemented by NVM controller 100 shown in FIG. 1.

Process 200 can begin by obtaining a memory address (201). For example, an NVM controller can obtain a memory address from a system bus. The NVM address can be bus address that associated with an NVM block in the NVM controller (on-chip memory). Process 200 continues by determining if the write access is to a secure data region (202). If no, the write data is written to a non-secure region in the NVM block at the memory address. If yes, the write data undergoes differential expansion (203), optional scrambling (204) and is then written to the secure data region in the NVM block at the memory address (206). Differential data expansion can be implemented using, for example, Equation [1]. Scrambling can be implemented using any known scrambling algorithm.

Figure 3:
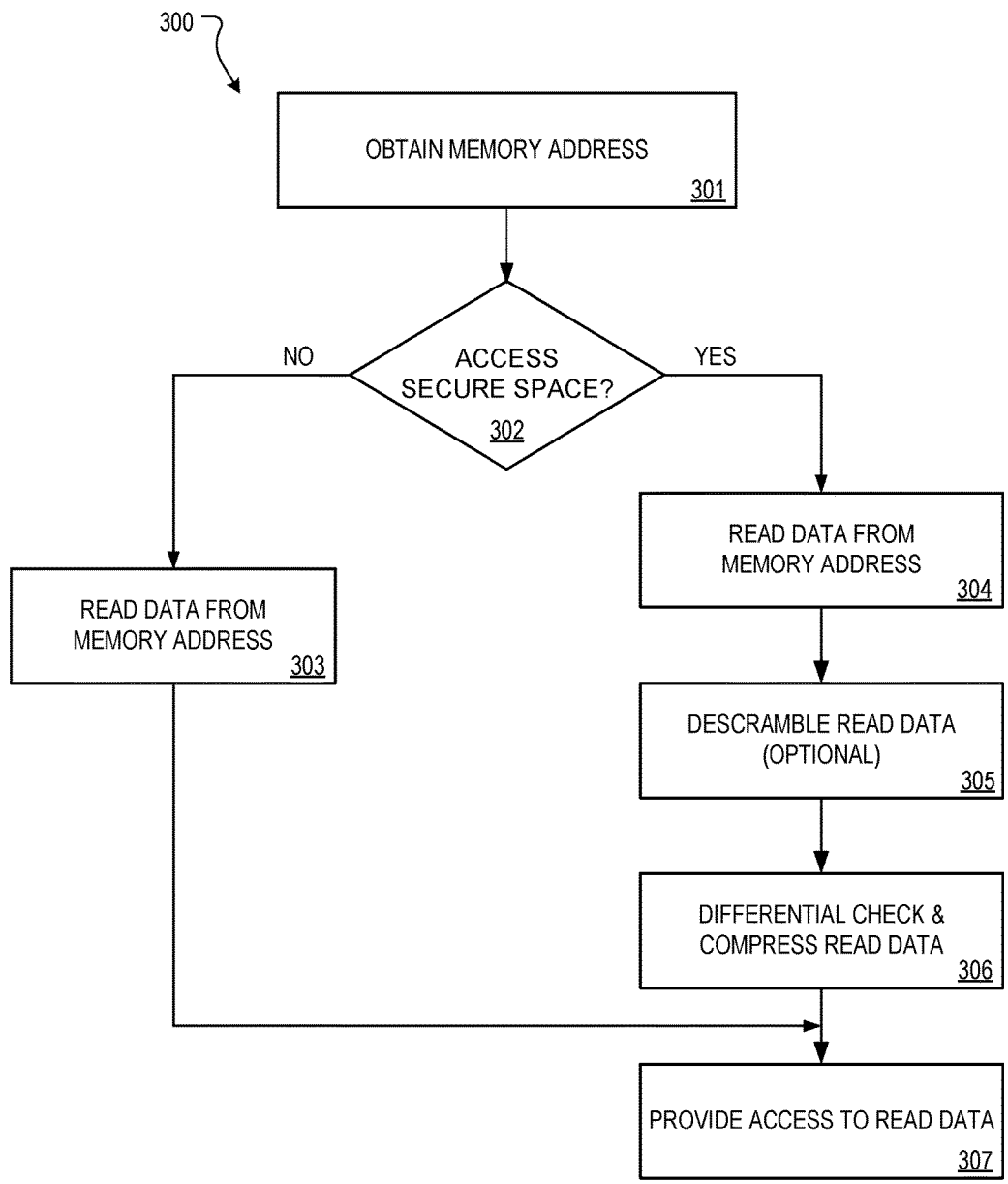
FIG. 3 is a flow diagram of process that uses security extensions to read secure data from NVM, according to an embodiment.

FIG. 3 is a flow diagram of process 300 that uses security extensions to read data from NVM, according to an embodiment. Process 300 can be implemented by NVM controller 100 shown in FIG. 1.

Process 300 can begin by obtaining a memory address (301). For example, an NVM controller can obtain a memory address from a system bus. The NVM address can be bus address that associated with an NVM block in the NVM controller (on-chip memory). Process 300 continues by determining if the read access is to a secure data region (302). If no, the data is read from a non-secure region in the NVM block at the memory address. If yes, the data is read from the NVM block at the memory address (304), optionally descrambled if stored scrambled (305) and subjected to a differential check and compression (306). The differential check and compression can be implemented using, for example, Equations [2] and [3]. Descrambling can be implemented using an inverse of the scrambling algorithm.

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A memory system comprising:
   memory;
   a memory controller coupled to the memory and operable to:
      receive a memory address and write data;

determine that the memory address accesses a secure data region in the non-volatile memory;

responsive to the determining, differentially expand the write data, wherein each bit of write data is converted to an m-bit counterpart and m is a positive integer greater than one; and write the expanded write data to the secure data region at the memory address.

2. The memory system of claim 1, further comprising:
responsive to the determining, differentially expanding and scrambling the write data.

3. The memory system of claim 1, further comprising:
a register operable to store data indicating a size of the secure data region in the memory.

4. The memory system of claim 1, wherein the memory controller is further operable to:
receive a memory address;
determine that the memory address accesses the secure data region in the memory;
responsive to the determining:
obtain differentially expanded read data from the memory at the memory address in the secure data region;
compress the differentially expanded read data to its pre-expanded form; and
provide access to the read data.

5. The memory system of claim 4, further comprising:
checking the integrity of the read data.

6. The memory system of claim 4, further comprising:
responsive to the determining, descrambling the read data.

7. The memory system of claim 1, wherein the memory is non-volatile memory.

8. A memory controller comprising:
non-volatile memory;
a processor coupled to the non-volatile memory and operable to:
receive a memory address and write data;
determine that the memory address accesses a secure data region in the non-volatile memory;
responsive to the determining, differentially expand the write data, wherein each bit of write data is converted to an m-bit counterpart and m is a positive integer greater than one; and
write the expanded write data to the secure data region at the memory address.

9. The memory controller of claim 8, further comprising:
responsive to the determining, differentially expanding and scrambling the write data.

10. The memory controller of claim 8, further comprising:
a register operable to store data indicating a size of the secure data region in the non-volatile memory.

11. The memory controller of claim 8, wherein the processor is further operable to:
receive the memory address;
determine that the memory address accesses the secure data region in the non-volatile memory;
responsive to the determining:
obtain differentially expanded read data from the non-volatile memory at the memory address in the secure data region;
compress the differentially expanded read data to its pre-expanded form; and
provide access to the read data.

12. The memory controller of claim 8, further comprising:
checking the integrity of the read data.

13. The memory controller of claim 8, further comprising:
responsive to the determining, descrambling the read data.

14. A method comprising:
receiving, by a memory controller, a memory address and write data;
determining, by the memory controller, that the memory address accesses a secure data region in memory;
responsive to the determining:
differentially expanding the write data, wherein each bit of write data is converted to an m-bit counterpart and m is a positive integer greater than one; and
writing the expanded write data to the secure data region at the memory address.

15. The method of claim 14, further comprising:
responsive to the determining, differentially expanding and scrambling the write data.

16. The method of claim 14, further comprising:
storing, by a register in the memory controller, data indicating a size of the secure data region in the memory.

17. The method of claim 14, further comprising:
receiving the memory address;
determining that the memory address accesses the secure data region in the memory;
responsive to the determining:
obtaining differentially expanded read data from the memory at the memory address in the secure data region;
compressing the differentially expanded read data to its pre-expanded form; and
providing access to the read data.

18. The method of claim 14, further comprising:
checking the integrity of the read data.

19. A non-transitory, computer-readable storage medium having instructions stored thereon, which, when executed one or more processors, causes the one or more processors to perform operations comprising:
receiving, by a memory controller, a memory address and write data;
determining, by the memory controller, that the memory address accesses a secure data region in memory embedded in or coupled to the memory controller;
responsive to the determining:
differentially expanding the write data, wherein each bit of write data is converted to an m-bit counterpart and m is a positive integer greater than one; and
writing the expanded write data to the secure data region at the memory address.

20. The non-transitory, computer-readable storage medium of claim 19, further comprising:
determining that the memory address accesses the secure data region in the memory;
responsive to the determining:
obtaining differentially expanded read data from the memory at the memory address in the secure data region;
compressing the differentially expanded read data to its pre-expanded form; and
providing access to the read data.

* * * * *